(No Model.)
A. & E. LISTER.
Filter.
No. 233,940. Patented Nov. 2, 1880.
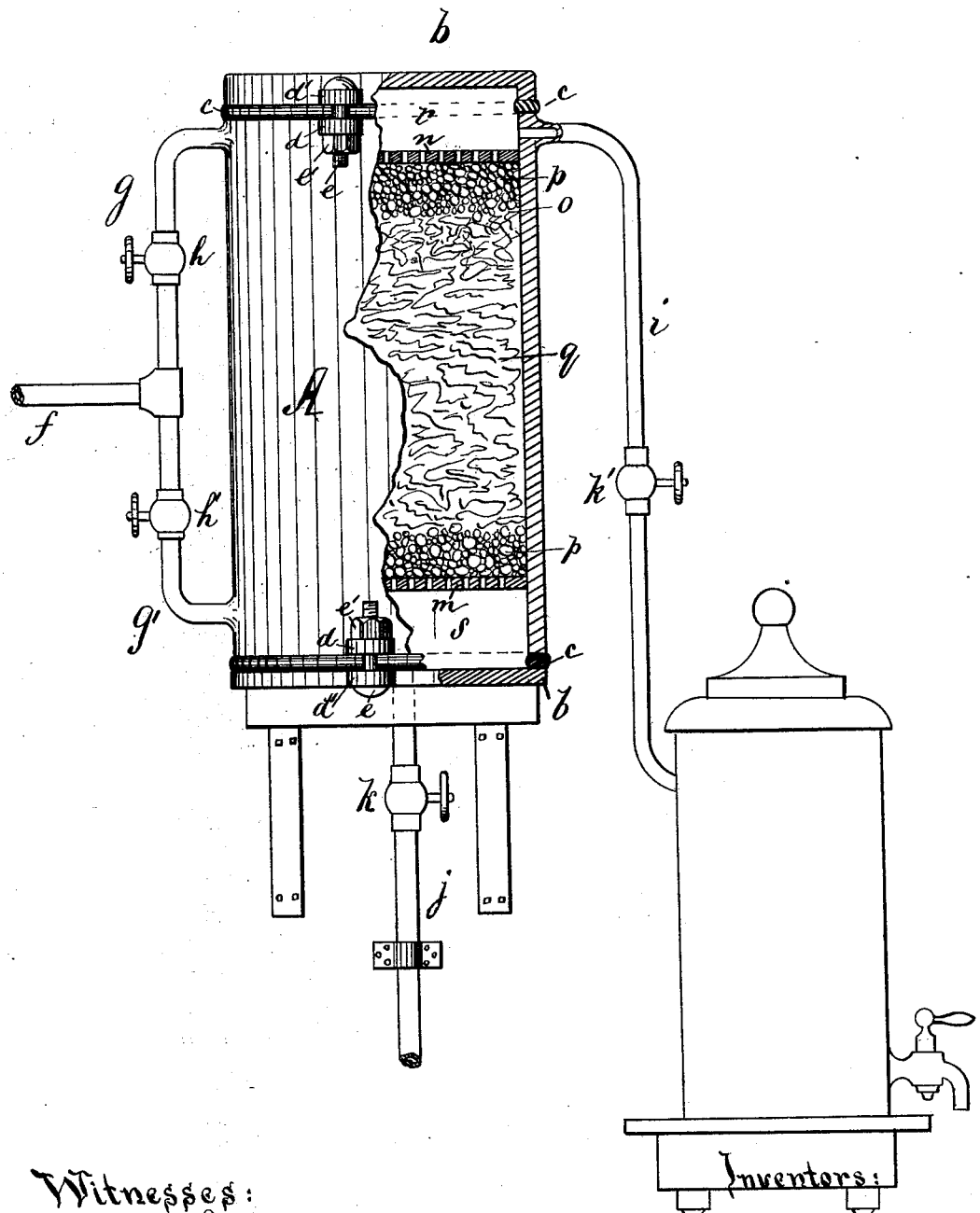
Witnesses:
Charles K. Pell
Chas. Herr.
Inventors:
Alfred Lister.
Edwin Lister.
By O. Drake, Atty.

United States Patent Office.

ALFRED LISTER AND EDWIN LISTER, OF NEWARK, NEW JERSEY.

FILTER.

SPECIFICATION forming part of Letters Patent No. 233,940, dated November 2, 1880.

Application filed June 16, 1880. (No model.)

*To all whom it may concern:*

Be it known that we, ALFRED LISTER and EDWIN LISTER, of Newark, in the county of Essex and State of New Jersey, have invented certain new and useful Improvements in Filters; and we do hereby declare the following to be a full, clear, and exact description of the invention, such as will enable others skilled in the art to which it appertains to make and use the same, reference being had to the accompanying drawing, and to letters of reference marked thereon, which form a part of this specification.

The object of this invention is to more thoroughly filter and purify the water and to provide improved means for cleansing the filter more expeditiously and effectively without going through the laborious and disagreeable process of removing the filter from its position or changing the filtering materials contained therein.

The invention consists in the construction, arrangement, and combination of parts hereinafter described, and then specified in the claim.

Referring to the drawing which accompanies this specification, A represents the cylindrical vessel; $b$, the detachable heads thereof; $c$, elastic packing placed in position between said heads and said cylinder to prevent leakage; $d$ and $d'$, lips or lugs upon both the cylinder and head thereof, perforated for the reception of the bolts $e$, which hold the cylinder and heads in close union. The heads $c$ are made detachable, so that access may be had to the pure-water and sediment chambers for the purpose of thoroughly cleansing the same. They are unconnected with the perforated partitions that hold the filtering material in position, because if connected with them they could not be removed without moving the partitions and disturbing the arrangement of the filtering material, to avoid the evil consequences of which it is necessary that some construction such as described should be devised.

Where the heads of the filtering-chamber are subject to frequent detachments for the purposes already set forth it becomes necessary that the heads and body should be held together by means that will admit of the easy attachment and detachment of the parts. When such means are employed the parts cannot be brought together so tightly as to form a water-tight joint unless some flexible waterproof substance be interposed between them. We make use of the packing $c$ for that purpose.

The water is brought to the filter from a reservoir by the inlet or supply pipe $f$, which connects with the pipe $g$ $g'$. The said pipe $g$ $g'$ is bent somewhat in a U shape, as shown in the drawing, and has its ends inserted into the cylinder at about the points shown, and thus connects the chambers $r$ and $s$ at the top and bottom of said cylinder. This pipe bears the valves $h$ and $h'$, the purposes of which will be hereinafter fully explained. Connected with the cylinder are also the pipes $i$ and $j$, both bearing valves $k$ $k'$, the former being an exit-pipe for the filtered water and the latter an exit-pipe for the sediment and vitiated water to pass through into the sewer or other receptacle when the filter is being cleansed.

The interior of the cylinder or vessel A is arranged substantially as shown in the drawing, $m$ being the permanently-secured diaphragm and $n$ the adjustable diaphragm. The latter may be arranged either in the position shown or between the pebbles and charcoal at the point $o$; or, again, there may be adjustable diaphragms in both positions at the same time, or they may be dispensed with altogether where the pressure is not too great. Between the diaphragms $m$ and $n$ are placed strata of coarse sand or gravel $p$ and animal charcoal $q$, and above and below these filtering materials are the chambers $r$ and $s$, for the purposes hereinafter mentioned.

In operating the invention the water is received from the supply or inlet pipe $f$, the valves $h$ and $k$ being closed, and passes through the pipe $g'$ into the chamber $s$. It then passes up through the perforated diaphragm $m$, thence through the pebbles and animal charcoal, by means of which it is clarified, thence into the chamber $r$, and finally out through the exit-pipe $i$, perfectly filtered for use. In this process the sediment will not penetrate through the charcoal, but will settle to a great extent, if not entirely, into the chamber $s$, or upon the lower strata of pebbles and charcoal, from which it may be easily and thoroughly removed whenever desired by turning off the valves $h'$ and $k'$ and opening the valves $h$ and $k$, when the water from the pipe $f$ passes through pipe $g$ into the chamber $r$, and thence in reverse order through the pebbles and charcoal, carrying with it the sediment which may have settled therein or in the chamber $s$ out into the sewer through the pipe $j$, as will be readily understood, thus readily and effectively cleansing the filter of the accumulated sediment.

We do not claim a filtering-chamber having within it two perforated plungers, connected each to a rod passed through the head of the cylinder and provided with a two-way supply-pipe; but, Having described our invention, what we do claim is—

The within-described filter, consisting of the cylinder A, divided into chambers $r$ and $s$ by perforated partitions $m$ and $n$, and having the interposed filtering material, combined with heads $b$, detachable without disturbing partitions $m$ and $n$, and a two-way supply-pipe and an exit-pipe, $i$, the several parts being arranged as described, to operate as set forth.

In testimony that we claim the foregoing we have hereunto set our hands this 4th day of June, 1880.

ALFRED LISTER.
    EDWIN LISTER.

Witnesses:
 CHARLES H. PELL,
 SPENCER LARKIN.